Oct. 2, 1945.  G. D. SHAEFFER  2,386,146
MILLING FIXTURE
Filed Jan. 2, 1943  3 Sheets-Sheet 1
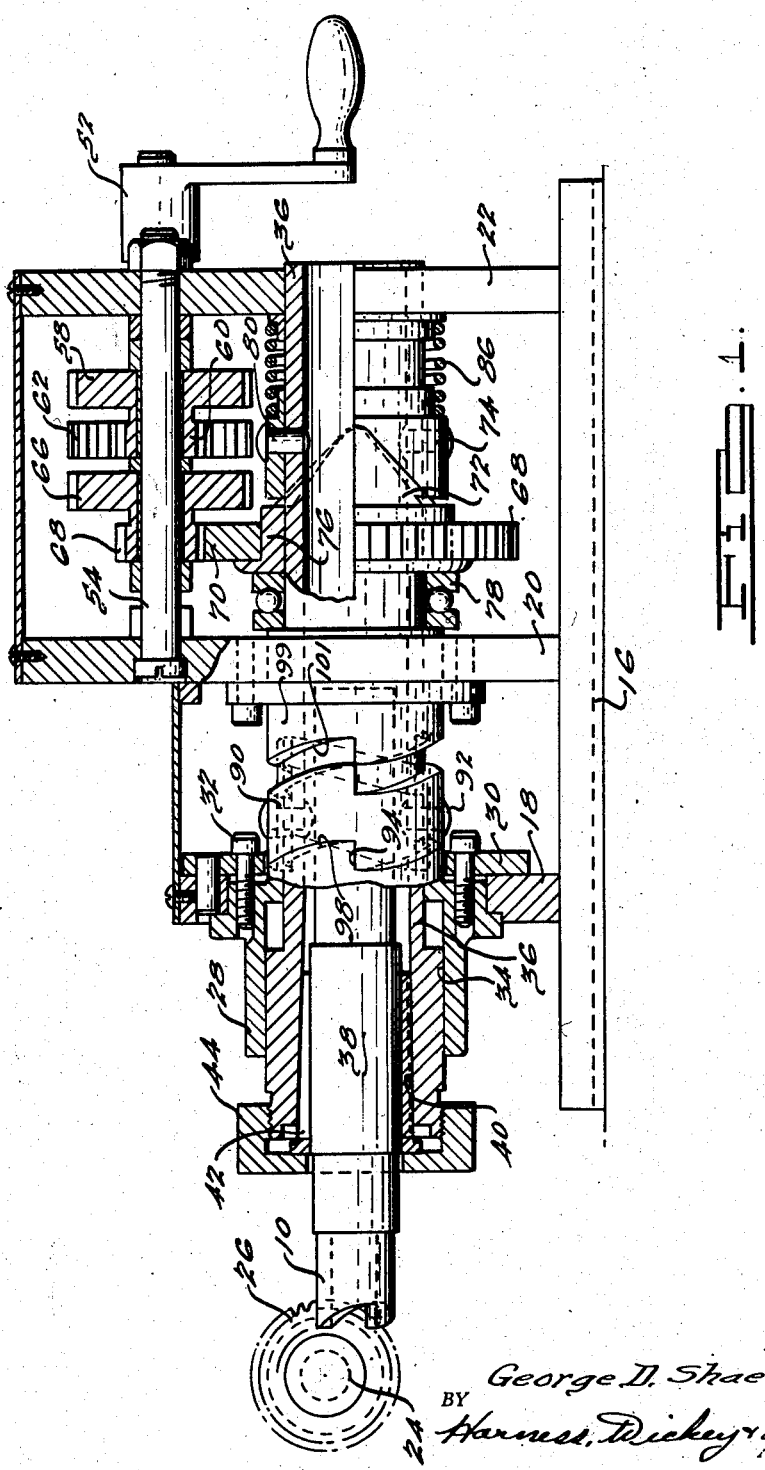
INVENTOR
George D. Shaeffer
BY Harness, Dickey & Pierce
ATTORNEYS Oct. 2, 1945.  G. D. SHAEFFER  2,386,146
MILLING FIXTURE
Filed Jan. 2, 1943  3 Sheets-Sheet 2
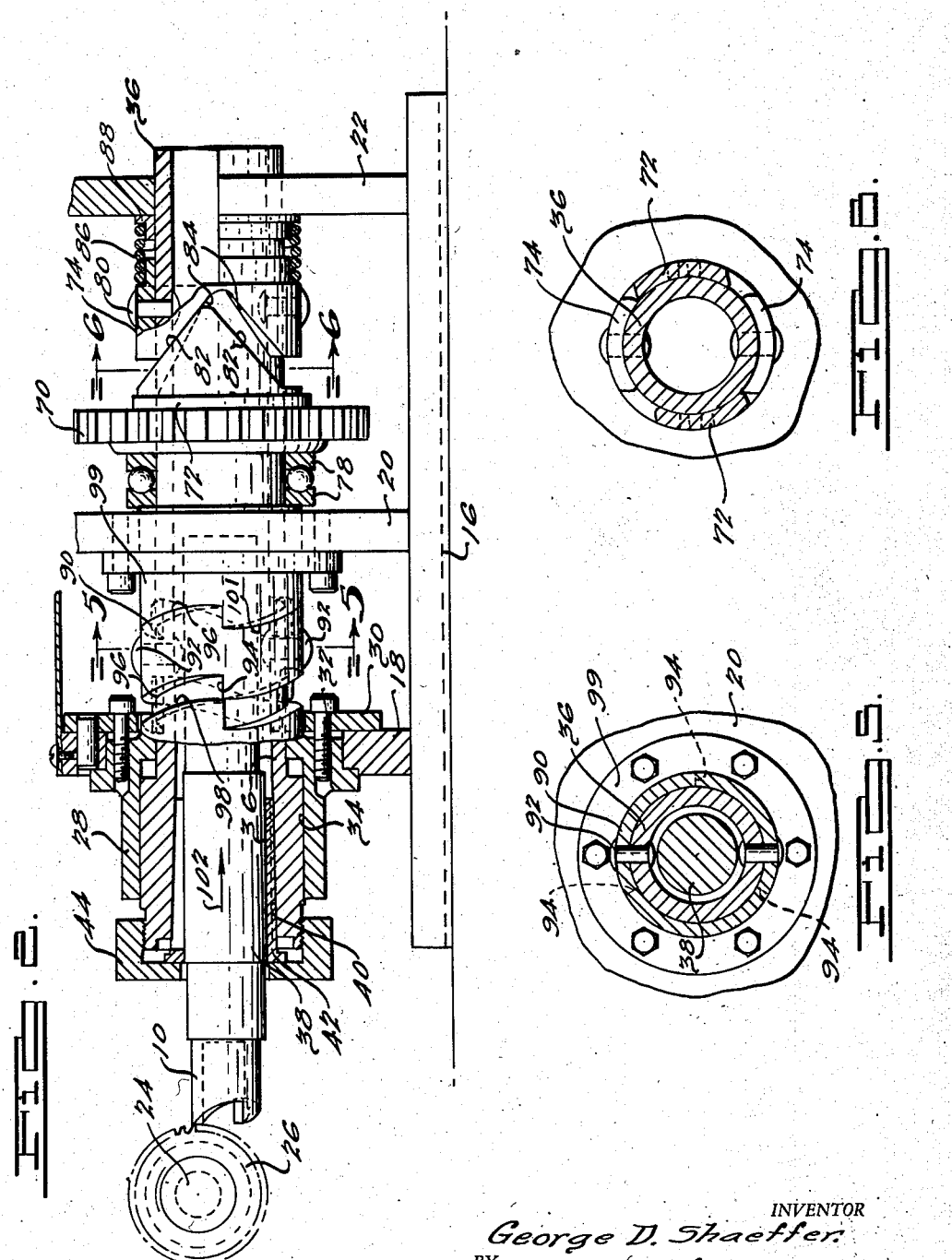
INVENTOR
George D. Shaeffer.
BY
Harness, Dickey & Pierce.
ATTORNEYS.

Oct. 2, 1945.　　　G. D. SHAEFFER　　　2,386,146
MILLING FIXTURE
Filed Jan. 2, 1943　　　3 Sheets-Sheet 3
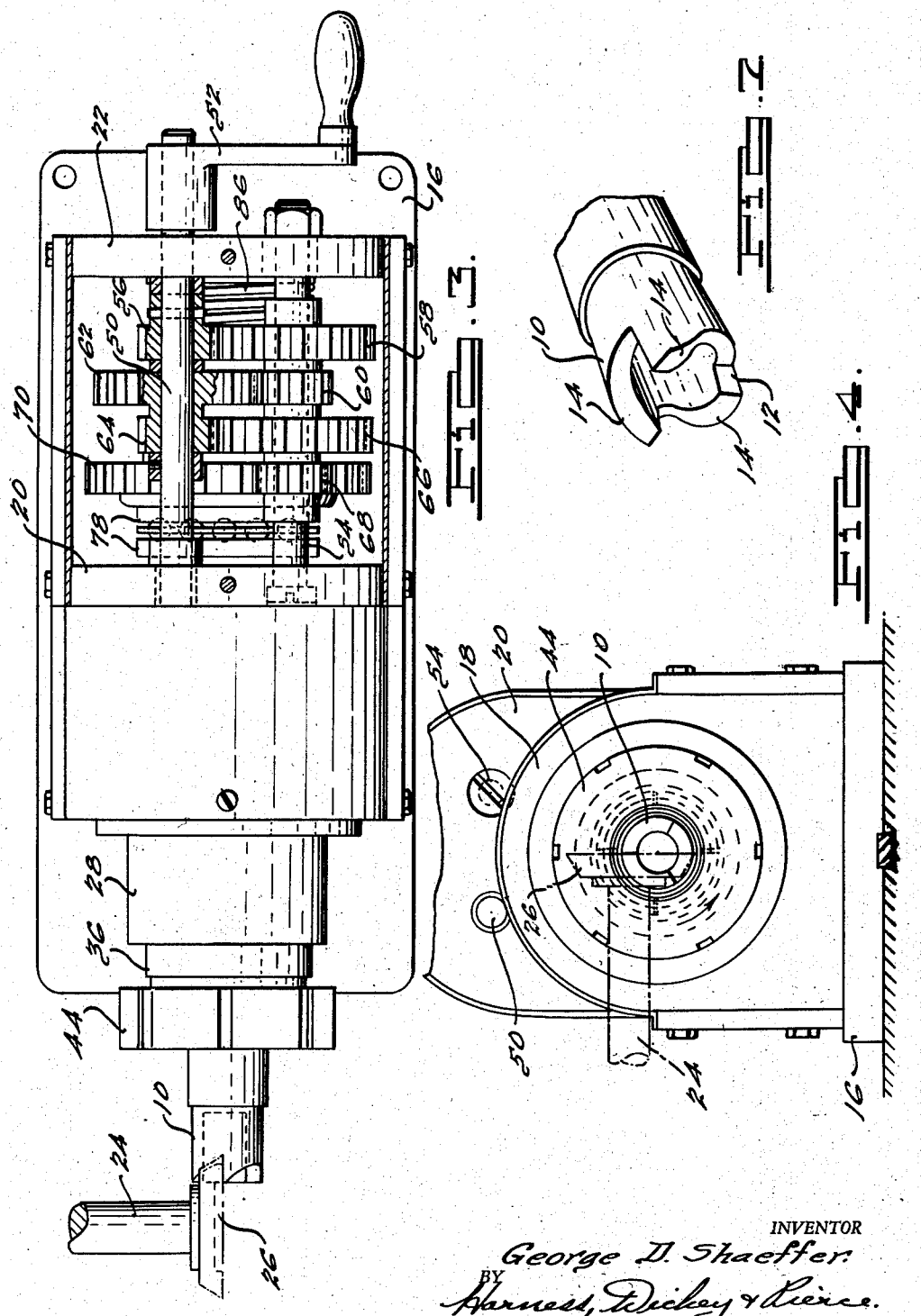
INVENTOR
George D. Shaeffer.
BY
Harness, Dickey & Pierce.
ATTORNEYS.

Patented Oct. 2, 1945

2,386,146

UNITED STATES PATENT OFFICE 2,386,146

MILLING FIXTURE

George D. Shaeffer, Detroit, Mich., assignor to Gar Wood Industries, Inc., Detroit, Mich., a corporation of Michigan Application January 2, 1943, Serial No. 471,113

1 Claim. (Cl. 90—20)

The present invention relates to a milling fixture and particularly relates to an apparatus for mounting a workpiece and causing such workpiece to follow a predetermined path of movement with respect to a milling cutter during the cutting of the workpiece.

One of the primary objects of the present invention is to provide an apparatus for mounting a workpiece in which jaw clutch teeth are to be formed and in which the workpiece is caused to follow a path of the form of the complete clutch teeth with respect to a milling cutter during the cutting operation.

Another object of the invention is to provide an apparatus of the type mentioned whereby jaw clutch teeth may be cut in a workpiece more quickly and economically than with prior apparatus.

A further object of the invention is to provide an apparatus of the type mentioned in which the jaw clutch teeth may be formed more uniformly accurate so that mating clutch members will accurately mesh.

Another object of the invention is to provide a machine to automatically form a plural jaw clutch, or the like, with unskilled workmen.

Other objects of the invention will become apparent from the following specification, the drawings relating thereto, and from the claim hereinafter set forth.

In the drawings, in which like numerals are used to designate like parts in the several views throughout:

Figure 1 is a vertical cross-sectional view, with parts in elevation, of a milling fixture embodying features of the present invention and showing such fixture with the workpiece mounted therein in one operating position with respect to a milling cutter;

Figure 2 is a partial view similar to Figure 1 and showing certain of the elements of the apparatus in a different operating position;

Figure 3 is a top plan view of the structure shown in Figure 1 with one of the cover members removed and showing the change gears;

Figure 4 is a front elevational view of the structure shown in Figure 1;

Figure 5 is a cross-sectional view taken substantially along the line 5—5 of Figure 2;

Figure 6 is a cross-sectional view taken along the line 6—6 of Figure 2; and

Figure 7 is a perspective view of a jaw clutch member formed by the apparatus of the present invention.

In general, the fixture of the present invention is adapted to be mounted upon a conventional milling machine and is of such a construction that the workpiece is supported adjacent the milling cutter and is caused to move in a predetermined path to mill the proper form thereon. In particular, the fixture of the present invention is constructed for the milling of a jaw clutch element in which the jaw clutch teeth are formed in the end of a tubular workpiece. The teeth are completely formed by the milling operation.

In the particular embodiment here described, a jaw clutch element, such as that shown in Figure 7 and indicated at 10, is being formed. The element 10 has three teeth formed with straight sides 12 which are parallel to the axis of the element and sloping sides 14. It will be appreciated, however, that other forms of jaw clutch members may be milled by slight changes in the particular embodiment disclosed; that is, clutch elements having more than three teeth and having teeth of different contours may be formed.

Referring to Figures 1 through 6, one embodiment of the fixture of the present invention is specifically illustrated. Such fixture includes a standard having a base 16 and integrally upstanding supporting members 18, 20 and 22. The standard is adapted to be secured on the table of a conventional milling machine. Such machine includes the usual horizontal arbor 24, upon which a milling cutter 26 is mounted. The table is mounted in the usual way for translatory movement and for vertical movement with respect to the arbor.

The members 18, 20 and 22 are provided with axially aligned apertures therethrough. A bearing sleeve 28 is mounted on the member 18 by means of a removable ring 30 which engages one side of the member 18, opposite to that of an annular shoulder formed on the member 28 and secured thereto by means of screws 32. The bearing member 28 has a bore 34 providing a bearing surface which is adapted to slidably and rotatably receive therein an enlarged portion of a tubular mounting member 36. Such member 36 is driven by means to be described hereinafter.

The clutch element 10 has an integral base portion 38 of enlarged diameter which is received within the tapered portion 40 of the bore of member 36. A collet 42 is received between the base 38 and the tapered portion 40 and is held in place by a collar 44, which is threaded over the end of member 36 to force the collet 42 axially and thus to lock the workpiece to the mounting member 36.

The mounting member 36 extends through the aligned apertures in members 20 and 22, and is slidably received within a bearing aperture provided in member 22.

The driving means includes a drive shaft 50, which is received between standard members 20 and 22 and which is mounted within aligned bearing openings therethrough. The shaft 50 may be suitably driven; and, in the embodiment illustrated, a hand crank 52 is employed which is secured to the rear projecting end of the shaft 50 for the purpose of turning such shaft. However, instead of the hand crank 52, such shaft may be otherwise driven from the power elements of the milling machine and may be suitably connected thereto, for example, through suitable gearing and a belt and pulley arrangement.

An idler shaft 54 is also mounted to the members 20 and 22 in parallel relationship to the shaft 50. A plurality of intermeshing reduction gears are mounted on shafts 50 and 54. Such reduction gears include a pinion 56, which is keyed to the shaft 50 for rotation therewith and which meshes with a gear 58 of a gear cluster including a pinion 60. Such gears 58 and 60 are mounted for free rotation on shaft 54. The pinion 60 meshes with a gear 62 of another cluster having a pinion 64. Such last named cluster is rotatably mounted on shaft 50. The pinion 64 meshes with a gear 66 of another cluster having a pinion 68. Such last named cluster is rotatably mounted on shaft 54.

The pinion 58 meshes with a ring gear 70, which is interconnected with and serves to drive the member 36 in a manner that will be described in detail hereinafter.

The driving means interconnecting the driving gear 70 and the driven mounting member 36 is a differential drive means which includes a pair of intermeshing engageable elements 72 and 74. The member 72 includes an annular hub portion 76 having a radially extending annular flange on one side thereof to which the gear 70 is secured for rotation therewith. A thrust bearing 78 is mounted on member 36 between member 76 and standard member 20, against which member 76 bears. The member 76 is provided with an axial bore which is mounted on member 36 so that there may be relative rotation therebetween.

The member 74 is secured to member 36 by means of rivets 80, or the like, so that members 36 and 74 move as a unit under the control of a cam guide, to be described in detail hereinafter. The members 72 and 74 are formed with intermeshing teeth, having engageable surfaces 82 and 84 which are adapted to bear against each other for providing the differential drive between members 70 and 36.

A compression spring 86 is disposed in surrounding relation to member 36 and has one end bearing against an annular shoulder formed on member 74 with the other end bearing against a shouldered ring 88. Such shouldered ring 88 is mounted on member 36 and bears against the inner face of standard member 22. The spring 86 serves to prevent the sudden attraction of the member 36 when the cam guide elements are in the position shown in Figure 1.

It will be appreciated that with the member 70 being continuously driven, if rotation of member 36 is retarded or stopped there will be an axial movement of member 74 with respect to member 72, so that there will be a corresponding axial movement of the workpiece mounting member 36. Thus, the driving connection between members 70 and 36 effects the movement of the workpiece with respect to the milling cutter, but such drive connection permits axial movement as well as rotative movement of the workpiece, so that by controlling the relative rotative and axial movement that part of the workpiece being presented to the milling cutter may be caused to follow a predetermined path in order that the desired shape may be milled thereon.

To so control the relative rotative and axial movement of the workpiece, means are provided which include a cam guide member 90, which is in the form of a sleeve fixed to member 36 by means of rivets 92 and located between the standard members 18 and 20. The cam member 90 is formed with cam guide surfaces on the opposite ends thereof which have the contour of the jaw clutch teeth to be formed on the workpiece 10. In the embodiment illustrated, such cam guide 90 has, in effect, three teeth, having straight portions 94 parallel to the axis of member 36 which are connected together by sloping portions 96. Elements having complementary contours are disposed on opposite sides of the member 90 and are fixed to the standard. The member 28 may have its inner end formed with such a complementary contour, as indicated at 98, another member 99 may be fixedly mounted to the standard member 20 and have a complementary contour 101. The complementary contours 98 and 101 are spaced from each other such a distance as to permit axial movement of the member 90 and, consequently, axial movement of the workpiece 10. This distance is equal to the depth of the tooth to be formed, or equal to the depth of the straight portion 94.

In the operation of the above-described apparatus, the work table is vertically adjusted with respect to the cutter 26 so that the axis of the arbor, or the center of the cutter, lies in horizontal plane approximately midway between the center of the wall of the workpiece being cut. In this way the effect of the radius of the cutter is reduced to a minimum and is within the tolerances allowed in this work.

The fixture is then fed toward the cutter to a working position by moving the bed of the milling machine in the usual way. By driving shaft 50, such drive is transmitted through the reduction gears to the driving gear 70. The drive from gear 70 is transmitted to the driven member 36 through elements 72 and 74. The complementary contours of members 92 and those contours indicated at 98 and 101 effect the relative rotation and axial movement of the workpiece with respect to the milling machine. The member 36 rotates and moves axially with the surface 96 of cam member 90 bearing against the sloping surfaces of contours 98 and 101. The sloping surface of contour 101 causes movement of the workpiece toward the cutter during such rotation. The sloping portion of contour 98 permits such rotative and axial movement. This will continue along the sloping portion until the cutter reaches its full depth of cut when the cam element 90 is in the position shown in Figure 1. When the cutter reaches this point, the straight portions 94 of the cam member 90 abut against the straight portions on contour 98, so that rotative movement of the member 36 is prevented. In this connection, if it were desired that such portion be at an angle, rather than parallel to the axis as here specifically described, the cam members could be given such contour, in which event the rotative action would be retarded while it would be permitted to the extent of the angle. With the rotative action of the member 36 stopped or retarded, the engaging surfaces 82 and 84 of members 72 and 74, respectively, will slide with respect to each other, causing axial movement of the member 74 against the action of spring 86. The members 70 and 72 will, of course, continue to rotate while the member 74, together with member 36, moves axially. Such axial movement is in the direction of the arrow 102 in Figure 2, and continues until the cam member 90 is in the position shown in Figure 2. At this position, the workpiece 10 has been withdrawn to the full depth of the tooth, so that the straight portions 94 are free of abutment against the straight portions of contour 98 and rotation and axial movement of the member 36 may then continue to cut the next sloping portion of the next tooth. The engagement between members 72 and 74 permits the axial movement, as well as the rotative movement, during the cutting of the sloping portions on the teeth.

It will be evident that by varying the contour of the cam or guide edges of member 90 and, correspondingly, by varying the contours 98 and 101, the workpiece will be caused to follow other paths. Thus other shapes than that particularly described here may be milled.

What is claimed is:

In a machine for supporting a workpiece during cutting by a cutting member, a standard, a driving member mounted on said standard, a driven member mounted on said standard, means holding a workpiece on said driven member, driving means interconnecting said driving and driven members, said driving means including a pair of frictionally intermeshing members, means resiliently urging the members toward each other, the construction and arrangement of said intermeshing members and said resilient means being such that one of said pair of members has combined and simultaneous rotative and axial movement with respect to the other during rotation of the other, means directly connecting said one of said pair of members with said driven member for movement as a unit therewith, and guide means interconnecting said driven member and said standard and acting through said driven member to rotate and to move axially while rotating so that said workpiece follows a predetermined path with respect to said cutting member.

GEORGE D. SHAEFFER.